United States Patent
Takeuchi et al.

(10) Patent No.: US 10,303,036 B2
(45) Date of Patent: May 28, 2019

(54) OPTICAL MODULATOR

(71) Applicant: Fujitsu Optical Components Limited, Kawasaki-shi, Kanagawa (JP)

(72) Inventors: Shintaro Takeuchi, Sapporo (JP); Yoshihiko Yoshida, Sapporo (JP); Yoshinobu Kubota, Yokohama (JP); Masaharu Doi, Sapporo (JP); Yasuhiro Ohmori, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 4 days.

(21) Appl. No.: 15/647,719

(22) Filed: Jul. 12, 2017

(65) Prior Publication Data
US 2018/0081251 A1    Mar. 22, 2018

(30) Foreign Application Priority Data
Sep. 20, 2016   (JP) .................. 2016-183268

(51) Int. Cl.
*G02F 1/225* (2006.01)
*G02B 6/00* (2006.01)
*G02F 1/21* (2006.01)

(52) U.S. Cl.
CPC ........ *G02F 1/225* (2013.01); *G02F 2001/212* (2013.01); *G02F 2201/06* (2013.01)

(58) Field of Classification Search
CPC ................................ G02B 6/225; G02B 6/00
USPC ............................................................ 385/3
See application file for complete search history.

(56) References Cited

U.S. PATENT DOCUMENTS

| | | | | |
|---|---|---|---|---|
| 5,101,450 A | * | 3/1992 | Olshansky | .......... H04J 14/0298 385/14 |
| 5,278,923 A | * | 1/1994 | Nazarathy | ............... G02F 1/225 385/1 |
| 5,835,212 A | * | 11/1998 | Kissa | .................... G02F 1/3136 356/477 |

(Continued)

FOREIGN PATENT DOCUMENTS

| | | |
|---|---|---|
| JP | 2010-185978 | 8/2010 |
| JP | 2010-217427 | 9/2010 |
| JP | 2014-149398 | 8/2014 |

OTHER PUBLICATIONS

Japanese Office Action dated May 23, 2017 in corresponding Japanese Patent Application No. 2016-183268.

*Primary Examiner* — Kaveh C Kianni
(74) *Attorney, Agent, or Firm* — Staas & Halsey LLP

(57) ABSTRACT

An optical modulator includes a substrate and an optical waveguide group. The optical waveguide group includes a pair of relay optical waveguides, a pair of first Mach-Zehnder type optical waveguides, and a pair of second Mach-Zehnder type optical waveguides. The pair of the first Mach-Zehnder type optical waveguides are connected to the pair of the relay optical waveguides and includes input ends arranged at positions that deviate from each other in a longitudinal direction of the substrate. The pair of the second Mach-Zehnder type optical waveguides are provided on a pair of branched waveguides of each of the first Mach-Zehnder type optical waveguides and includes input ends arranged at symmetric positions with respect to a straight line that passes through an input end serving as a branch point of the branched waveguides and that extends in the longitudinal direction of the substrate.

3 Claims, 3 Drawing Sheets

(56) References Cited

U.S. PATENT DOCUMENTS

| | | | | |
|---|---|---|---|---|
| 6,163,395 | A * | 12/2000 | Nemecek | H04B 10/5053 348/E7.094 |
| 8,320,720 | B2 * | 11/2012 | Webster | G02F 1/0121 385/14 |
| 9,568,801 | B2 * | 2/2017 | Sugiyama | G02F 1/011 |
| 2006/0072866 | A1 * | 4/2006 | Mizuno | G02B 6/12007 385/1 |
| 2009/0041472 | A1 * | 2/2009 | Kawanishi | G02F 1/225 398/187 |
| 2010/0067841 | A1 * | 3/2010 | Sugiyama | G02F 1/2255 385/3 |
| 2010/0202723 | A1 * | 8/2010 | Sugiyama | G02F 1/0316 385/2 |
| 2010/0202784 | A1 | 8/2010 | Sugiyama | |
| 2010/0232737 | A1 | 9/2010 | Sugiyama et al. | |
| 2011/0158576 | A1 * | 6/2011 | Kissa | G02F 1/225 385/3 |
| 2012/0106888 | A1 * | 5/2012 | Goh | G02F 1/0327 385/3 |
| 2015/0234252 | A1 * | 8/2015 | Sugiyama | G02F 1/225 385/2 |
| 2015/0378237 | A1 | 12/2015 | Okamura et al. | |

* cited by examiner

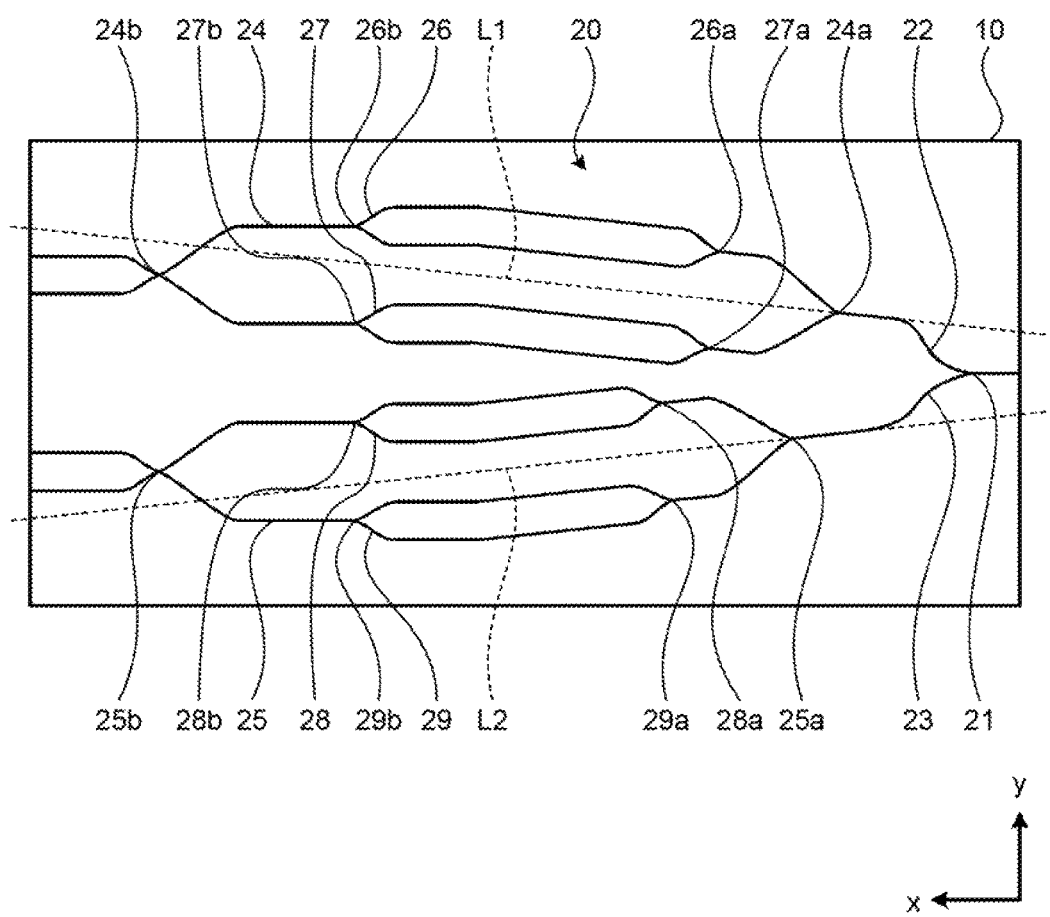

OPTICAL MODULATOR

CROSS-REFERENCE TO RELATED APPLICATION

This application is based upon and claims the benefit of priority of the prior Japanese Patent Application No. 2016-183268, filed on Sep. 20, 2016, the entire contents of which are incorporated herein by reference.

FIELD

The embodiment discussed herein is related to an optical modulator.

BACKGROUND

With the recent increase in the capacities of optical transmission systems, modulation rates and the scale of configurations of optical transmission devices equipped with optical modulators are increasing. Therefore, it is desirable to reduce the size of an optical modulator by integrating a plurality of Mach-Zehnder type optical waveguides (hereinafter, described as "MZ optical waveguides"), which perform optical modulation, into an optical waveguide group on a single substrate.

In an optical modulator in which a plurality of MZ optical waveguides are integrated into an optical waveguide group on a single substrate, the plurality of MZ optical waveguides are provided in parallel on the substrate. Specifically, a pair of relay optical waveguides branch from an optical waveguide for inputting light, a pair of first MZ optical waveguides are connected to the pair of the relay optical waveguides, and a pair of second MZ optical waveguides are provided on a pair of branched waveguides (hereinafter, described as "arms") of each of the first MZ optical waveguides. However, in an optical modulator in which a plurality of MZ optical waveguides are provided on the substrate, the size in a longitudinal direction of the substrate is increased in order to accommodate the lengths of the pair of the relay optical waveguides and the lengths of the pair of the arms of each of the first MZ optical waveguides.

Incidentally, there is a known structure in which input ends of a plurality of MZ optical waveguides (i.e., the pair of the first MZ optical waveguides and the pair of the second MZ optical waveguides) are arranged at positions that deviate from one another in the longitudinal direction of the substrate. If the input ends of the plurality of MZ optical waveguides are arranged at positions that deviate from one another in the longitudinal direction of the substrate, the lengths of the pair of the relay optical waveguides and the lengths of the pair of the arms of each of the first MZ optical waveguides are reduced to some extent; therefore, it becomes possible to reduce the size in the longitudinal direction of the substrate.

Patent Literature 1: Japanese Laid-open Patent Publication No. 2010-185978

However, with the structure in which the input ends of the plurality of MZ optical waveguides are arranged at positions that deviate from one another in the longitudinal direction of the substrate, while it is possible to reduce the size in the longitudinal direction of the substrate, it is difficult to reduce deterioration of an optical property, such as an extinction ratio.

Specifically, with the structure in which the input ends of the plurality of MZ optical waveguides are arranged at positions that deviate from one another in the longitudinal direction of the substrate, the pair of the second MZ optical waveguides provided on the pair of the arms of each of the first MZ optical waveguides are arranged at asymmetric positions. Therefore, a difference in optical losses occurs between the pair of the arms of each of the first MZ optical waveguides, and, as a result, an optical property, such as an extinction ratio, of the entire optical modulator may deteriorate.

According to an embodiment, an optical modulator disclosed in the present application includes a substrate and an optical waveguide group provided on the substrate. The optical waveguide group includes a pair of relay optical waveguides, a pair of first Mach-Zehnder type optical waveguides, and a pair of second Mach-Zehnder type optical waveguides. The pair of the relay optical waveguides branch from an optical waveguide for inputting light. The pair of the first Mach-Zehnder type optical waveguides are connected to the pair of the relay optical waveguides and includes input ends arranged at positions that deviate from each other in a longitudinal direction of the substrate. The pair of the second Mach-Zehnder type optical waveguides are provided on a pair of branched waveguides of each of the first Mach-Zehnder type optical waveguides and includes input ends arranged at symmetric positions with respect to a straight line that passes through an input end serving as a branch point of the branched waveguides and that extends in the longitudinal direction of the substrate.

SUMMARY

According to an aspect of an embodiment, an optical modulator includes a substrate; and an optical waveguide group provided on the substrate, wherein the optical waveguide group includes a pair of relay optical waveguides that branch from an optical waveguide for inputting light; a pair of first Mach-Zehnder type optical waveguides that are connected to the pair of the relay optical waveguides and include input ends arranged at positions that deviate from each other in a longitudinal direction of the substrate; and a pair of second Mach-Zehnder type optical waveguides that are provided on a pair of branched waveguides of each of the first Mach-Zehnder type optical waveguides and include input ends arranged at symmetric positions with respect to a straight line that passes through an input end serving as a branch point of the branched waveguides and that extends in the longitudinal direction of the substrate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a plan view illustrating a configuration example of an optical modulator of a second modification.

DESCRIPTION OF EMBODIMENT

Preferred embodiments of the present invention will be explained with reference to accompanying drawings. The disclosed technology is not limited to the embodiments.

Figure 1:
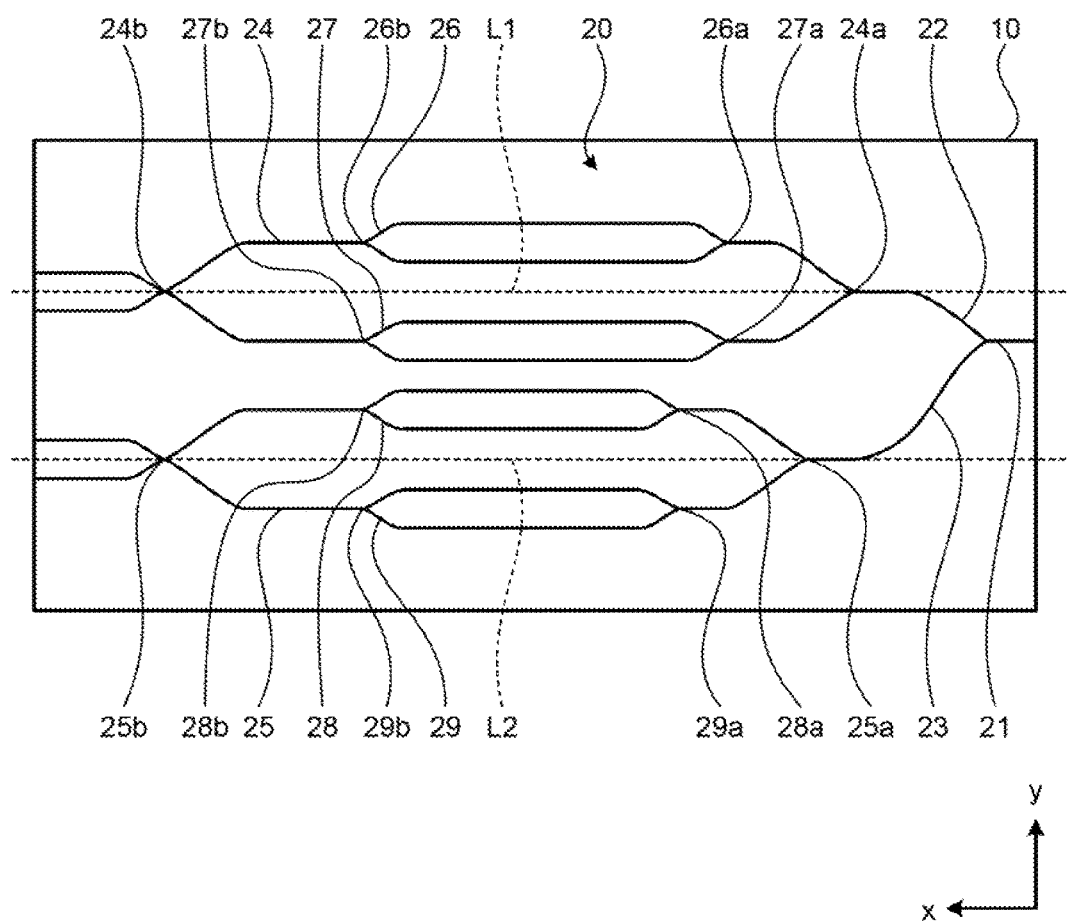
FIG. 1 is a plan view illustrating a configuration example of an optical modulator of an embodiment.

FIG. 1 is a plan view illustrating a configuration example of an optical modulator of an embodiment. The optical modulator illustrated in FIG. 1 includes a substrate 10 and an optical waveguide group 20 provided on the substrate 10. In the following descriptions, a longitudinal direction of the substrate 10 will be described as an "x direction", and a direction perpendicular to the "x direction" will be described as a "y direction".

The substrate 10 is made with a material having an electro-optic effect. As the material having the electro-optic effect, for example, Lithium Niobate (LN) may be used.

The optical waveguide group 20 is formed by, for example, forming a metal film, such as titanium (Ti), on a part of the substrate 10 and then performing thermal diffusion. Furthermore, a plurality of electrodes (not illustrated) are provided on the optical waveguide group 20. The optical waveguide group 20 propagates light from a light source and performs optical modulation based on electrical signals provided to the plurality of electrodes.

The optical waveguide group 20 includes, as illustrated in FIG. 1, an input optical waveguide 21, a pair of relay optical waveguides 22 and 23, a pair of first MZ optical waveguides 24 and 25, a pair of second MZ optical waveguides 26 and 27, and a pair of second MZ optical waveguides 28 and 29.

The input optical waveguide 21 is a waveguide for inputting light.

The pair of the relay optical waveguides 22 and 23 branch from the input optical waveguide 21. The pair of the relay optical waveguides 22 and 23 are curved in approximate S-shapes.

The pair of the first MZ optical waveguides 24 and 25 are connected to the pair of the relay optical waveguides 22 and 23. Input ends 24a and 25a of the pair of the first MZ optical waveguides 24 and 25 are arranged at positions that deviate from each other in the longitudinal direction (i.e., the x direction) of the substrate 10. In the example in FIG. 1, the input end 24a of the first MZ optical waveguide 24 is arranged at a position relatively close to the input optical waveguide 21 in the x direction, and the input end 25a of the first MZ optical waveguide 25 is arranged at a position relatively far from the input optical waveguide 21 in the x direction. Here, it is assumed that a curvature and a central angle of the relay optical waveguide 22 are denoted by $R_x$ and $\theta_x$, and a curvature and a central angle of the relay optical waveguide 23 are denoted by $R_y$ and $\theta_y$. In this case, the input ends 24a and 25a of the pair of the first MZ optical waveguides 24 and 25 are arranged at positions that deviate from each other in the x direction such that, for example, relationships of $R_x=R_y$ and $\theta_x<\theta_y$ are obtained. By arranging the input ends 24a and 25a of the pair of the first MZ optical waveguides 24 and 25 so as to be deviated from each other in the x direction, the lengths of the pair of the relay optical waveguides 22 and 23 are reduced to some extent. Consequently, it becomes possible to reduce the size in the longitudinal direction (i.e., the x direction) of the substrate 10.

Furthermore, in a pair of arms of the first MZ optical waveguide 24, portions from the input end 24a, which is a branch point of the arms, to input ends 26a and 27a of the pair of the second MZ optical waveguides 26 and 27 are curved in approximate S-shapes. Moreover, in the pair of the arms of the first the MZ optical waveguide 25, portions from the input end 25a, which is a branch point of the arms, to input ends 28a and 29a of the pair of the second MZ optical waveguides 28 and 29 are curved in approximate S-shapes.

Furthermore, the pair of the arms of each of the first MZ optical waveguides 24 and 25 as a pair are arranged at symmetric positions with respect to a straight line L1 or straight line L2, which will be described later.

The pair of the second MZ optical waveguides 26 and 27 are provided on the pair of the arms of the first MZ optical waveguide 24. The input ends 26a and 27a of the pair of the second MZ optical waveguides 26 and 27 are arranged at symmetric positions with respect to the straight line L1 that passes through the input end 24a, which is the branch point of the arms of the first MZ optical waveguide 24, and that extends in the longitudinal direction (i.e., the x direction) of the substrate 10. In other words, the input ends 26a and 27a of the pair of the second MZ optical waveguides 26 and 27 are arranged such that a distance between the input end 24a and the input end 26a along the straight line L1 becomes equal to a distance between the input end 24a and the input end 27a along the straight line L1. Here, it is assumed that, in the upper arm of the first MZ optical waveguide 24, a curvature and a central angle of a portion from the input end 24a to the input end 26a of the second MZ optical waveguide 26 are denoted by $R_{i1}$ and $\theta_{i1}$. Furthermore, in the lower arm of the first MZ optical waveguide 24, a curvature and a central angle of a portion from the input end 24a to the input end 27a of the second MZ optical waveguide 27 are denoted by $R_{q1}$ and $\theta_{q1}$. In this case, the input ends 26a and 27a of the pair of the second MZ optical waveguides 26 and 27 are arranged at symmetric positions with respect to the straight line L1 such that, for example, relationships of $R_{i1}=R_{q1}$ and $\theta_{i1}=\theta_{q1}$ are obtained. By arranging the input ends 26a and 27a of the pair of the second MZ optical waveguides 26 and 27 at symmetric positions with respect to the straight line L1, a difference in optical losses between the pair of the arms of the first MZ optical waveguide 24 is reduced. Therefore, photosynthesis is efficiently performed at an output end 24b that is a meeting point of the pair of the arms of the first MZ optical waveguide 24. Consequently, it is possible to reduce deterioration of an optical property, such as an extinction ratio, of the entire optical modulator.

Furthermore, output ends 26b and 27b of the pair of the second MZ optical waveguides 26 and 27 are arranged at symmetric positions with respect to the straight line L1. By arranging the output ends 26b and 27b of the pair of the second MZ optical waveguides 26 and 27 at symmetric positions with respect to the straight line L1, a difference in optical losses between the pair of the arms of the first MZ optical waveguide 24 is further reduced. Therefore, photosynthesis is more efficiently performed at the output end 24b that is the meeting point of the pair of the arms of the first MZ optical waveguide 24. Consequently, it is possible to further reduce deterioration of an optical property, such as an extinction ratio, of the entire optical modulator.

The pair of the second MZ optical waveguides 28 and 29 are provided on a pair of arms of the first MZ optical waveguide 25. The input ends 28a and 29a of the pair of the second MZ optical waveguides 28 and 29 are arranged at symmetric positions with respect to the straight line L2 that passes through the input end 25a, which is the branch point of the arms of the first MZ optical waveguide 25, and that extends in the longitudinal direction (i.e., the x direction) of the substrate 10. In other words, the input ends 28a and 29a of the pair of the second MZ optical waveguides 28 and 29 are arranged such that a distance between the input end 25a and the input end 28a becomes equal to a distance between the input end 25a and the input end 29a in the direction of the straight line L2. Here, it is assumed that, in the upper arm of the first MZ optical waveguide 25, a curvature and a central angle of a portion from the input end 25a to the input end 28a of the second MZ optical waveguide 28 are denoted by $R_{l2}$ and $\theta_{l2}$. Furthermore, in the lower arm of the first MZ optical waveguide 25, a curvature and a central angle of a portion from the input end 25a to the input end 29a of the second MZ optical waveguide 29 are denoted by $R_{q2}$ and $\theta_{q2}$. In this case, the input ends 28a and 29a of the pair of the second MZ optical waveguides 28 and 29 are arranged at symmetric positions with respect to the straight line L2 such that, for example, relationships of $R_{l2}=\theta_{q2}$ and $\theta_{l2}=\theta_{q2}$ are obtained. By arranging the input ends 28a and 29a of the pair of the second MZ optical waveguides 28 and 29 at symmetric positions with respect to the straight line L2, a difference in optical losses between the pair of the arms of the first MZ optical waveguide 25 is reduced. Therefore, photosynthesis is efficiently performed at an output end 25b that is a meeting point of the pair of the arms of the first MZ optical waveguide 25. Consequently, it is possible to reduce deterioration of an optical property, such as an extinction ratio, of the entire optical modulator.

Moreover, output ends 28b and 29b of the pair of the second MZ optical waveguides 28 and 29 are arranged at symmetric positions with respect to the straight line L2. By arranging the output ends 28b and 29b of the pair of the second MZ optical waveguides 28 and 29 at symmetric positions with respect to the straight line L2, a difference in optical losses between the pair of the arms of the first MZ optical waveguide 25 is further reduced. Therefore, photosynthesis is more efficiently performed at the output end 25b that is the meeting point of the pair of the arms of the first MZ optical waveguide 25. Consequently, it is possible to further reduce deterioration of an optical property, such as an extinction ratio, of the entire optical modulator.

As described above, the optical modulator of the embodiment includes the substrate 10 and the optical waveguide group 20 provided on the substrate 10. The optical waveguide group 20 includes the pair of the relay optical waveguides 22 and 23, the pair of the first MZ optical waveguides 24 and 25, and the pair of the second MZ optical waveguides 26 and 27. The pair of the relay optical waveguides 22 and 23 branch from the input optical waveguide 21. The pair of the first MZ optical waveguides 24 and 25 are connected to the pair of the relay optical waveguides 22 and 23, and includes the input ends 24a and 25a arranged at positions that deviate from each other in the longitudinal direction (i.e., the x direction) of the substrate 10. The pair of the second MZ optical waveguides 26 and 27 are provided on a pair of optical branched waveguides (arms) of each of the first MZ optical waveguides (for example, the first MZ optical waveguide 24) as a pair. The input ends 26a and 27a of the pair of the second MZ optical waveguides 26 and 27 are arranged at symmetric positions with respect to the straight line L1 that passes through the input end 24a, which is the branch point of the arms of the first MZ optical waveguide 24, and that extends in the longitudinal direction of the substrate 10.

With this configuration of the optical modulator, it is possible to reduce the size in the longitudinal direction of the substrate 10 and reduce deterioration of an optical property.

Modification

Figure 2:
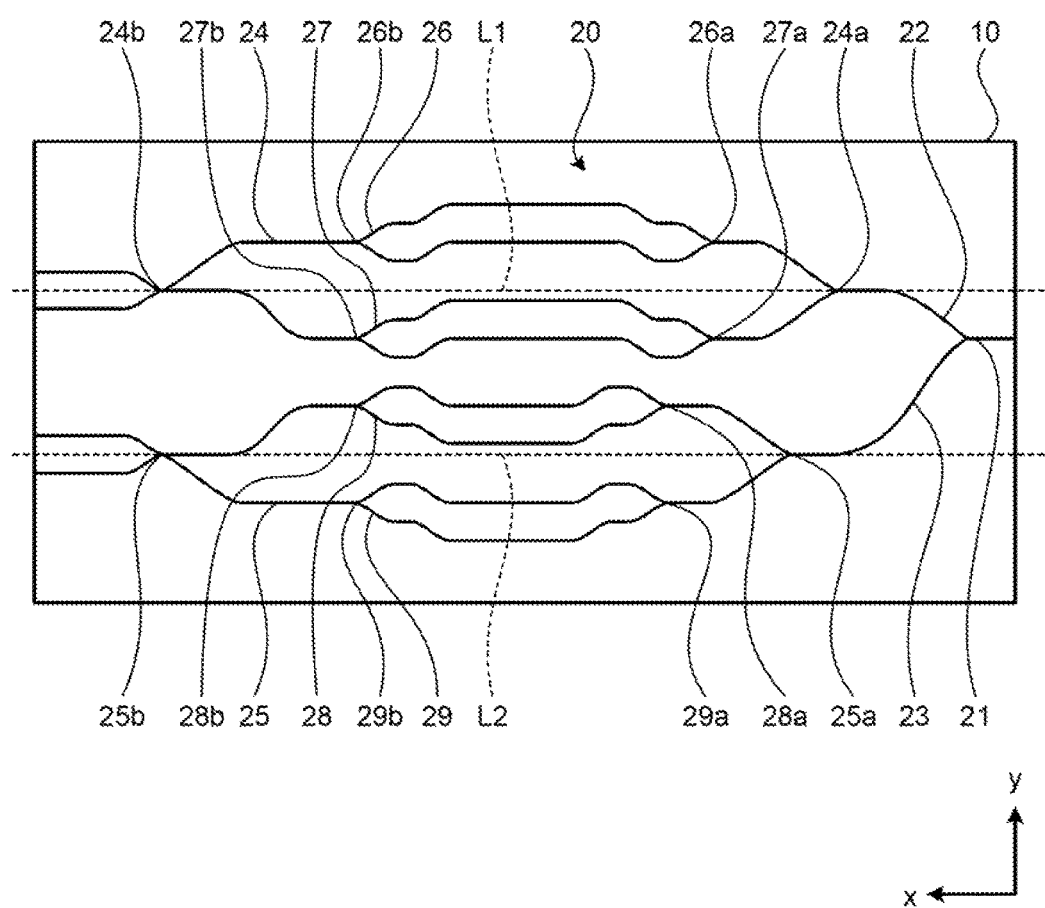
FIG. 2 is a plan view illustrating a configuration example of an optical modulator of a first modification.

In the above-described embodiment, an example has been described in which the pair of the arms of each of the first MZ optical waveguides 24 and 25 as a pair are arranged at symmetric positions with respect to the straight line L1 or the straight line L2; however, the disclosed technology is not limited to this example. For example, as illustrated in FIG. 2, as long as the input ends 26a and 27a of the pair of the second MZ optical waveguides 26 and 27 are arranged at symmetric positions with respect to the straight line L1, the pair of the arms of the first MZ optical waveguide 24 may be arranged at asymmetric positions with respect to the straight line L1. Furthermore, as long as the input ends 28a and 29a of the pair of the second MZ optical waveguides 28 and 29 are arranged at symmetric positions with respect to the straight line L2, the pair of the arms of the first MZ optical waveguide 25 may be arranged at asymmetric positions with respect to the straight line L2. In the modification as described above, the pair of the arms of the first MZ optical waveguide 24 may have different curvatures and different central angles. Moreover, the pair of the arms of the first MZ optical waveguide 25 may have different curvatures and different central angles. Incidentally, FIG. 2 is a plan view illustrating a configuration example of an optical modulator of a first modification.

Furthermore, in the above-described embodiment, an example has been described in which both of the straight line L1 and the straight line L2 extend in the longitudinal direction (i.e., the x direction) of the substrate 10; however, the straight line L1 and the straight line L2 may extend in directions that are included in the longitudinal direction of the substrate 10 and that are two different directions. FIG. 3 is a plan view illustrating a configuration example of an optical modulator of a second modification. In FIG. 3, a direction of light incident on the input end 24a serving as the branch point of the arms of the first MZ optical waveguide 24 and a direction of light incident on the input end 25a serving as the branch point of the arms of the first MZ optical waveguide 25 are included in the longitudinal direction of the substrate 10 and are different from each other. In this case, the straight line L1 extends in the direction of light incident on the input end 24a serving as the branch point of the arms of the first MZ optical waveguide 25, and the straight line L2 extends in the direction of light incident on the input end 25a serving as the branch point of the arms of the first MZ optical waveguide 25. Even with the configuration illustrated in FIG. 3, the input ends 26a and 27a of the pair of the second MZ optical waveguides 26 and 27 are arranged at symmetric positions with respect to the straight line L1, and the input ends 28a and 29a of the pair of the second MZ optical waveguides 28 and 29 are arranged at symmetric positions with respect to the straight line L2. Consequently, it is possible to reduce the size in the longitudinal direction of the substrate 10 and reduce deterioration of an optical property.

According to an embodiment of the optical modulator disclosed in the present application, it is possible to reduce the size in the longitudinal direction of the substrate and reduce deterioration of an optical property.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:
1. An optical modulator comprising:
a substrate; and
an optical waveguide group provided on the substrate, wherein
the optical waveguide group includes a pair of relay optical waveguides that branch from an optical waveguide for inputting light;

a pair of first Mach-Zehnder type optical waveguides that include input ends, each of the input ends serving as a branch point of a pair of branched waveguides, connected to the pair of the relay optical waveguides and arranged at positions that deviate from each other in a longitudinal direction of the substrate; and a pair of second Mach-Zehnder type optical waveguides that are provided on the pair of branched waveguides of each of the first Mach-Zehnder type optical waveguides and include input ends arranged at symmetric positions with respect to a straight line that passes through an input end serving as the branch point of the pair of branched waveguides and that extends in the longitudinal direction of the substrate.

2. The optical modulator according to claim 1, wherein output ends of the pair of the second Mach-Zehnder type optical waveguides are arranged at symmetric positions with respect to the straight line.

3. The optical modulator according to claim 1, wherein the pair of the branched waveguides of the first Mach-Zehnder type optical waveguides are arranged at symmetric positions with respect to the straight line.

* * * * *